United States Patent
Lee et al.

(10) Patent No.: US 10,374,207 B2
(45) Date of Patent: Aug. 6, 2019

(54) RECHARGEABLE BATTERY HAVING CURRENT COLLECTOR

(71) Applicant: SAMSUNG SDI CO., LTD., Yongin-si, Gyeonggi-do (KR)

(72) Inventors: Hyun-Soo Lee, Yongin-si (KR); Jeong-Won Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 644 days.

(21) Appl. No.: 14/964,377

(22) Filed: Dec. 9, 2015

(65) Prior Publication Data
US 2016/0372735 A1    Dec. 22, 2016

(30) Foreign Application Priority Data
Jun. 16, 2015 (KR) .................. 10-2015-0085280

(51) Int. Cl.
*H01M 2/26* (2006.01)
*H01M 2/02* (2006.01)
*H01M 2/30* (2006.01)
*H01M 2/06* (2006.01)
*H01M 4/70* (2006.01)

(52) U.S. Cl.
CPC ............ *H01M 2/26* (2013.01); *H01M 2/024* (2013.01); *H01M 2/06* (2013.01); *H01M 2/30* (2013.01); *H01M 2/305* (2013.01); *H01M 4/70* (2013.01); *H01M 2220/20* (2013.01)

(58) Field of Classification Search
CPC ............ H01M 2/26; H01M 2/30; H01M 2/06; H01M 4/70; H01M 2/305; H01M 2/024; H01M 2220/20

USPC ........................................................ 429/179
See application file for complete search history.

(56) References Cited

U.S. PATENT DOCUMENTS

| 8,835,044 B2 | 9/2014 | Kim et al. |
| 2007/0026307 A1* | 2/2007 | Kim ............ H01M 2/263 429/161 |
| 2012/0141850 A1 | 6/2012 | Jeong |
| 2012/0251874 A1* | 10/2012 | Guen ............ H01M 2/0217 429/179 |
| 2013/0115494 A1 | 5/2013 | Kim |

FOREIGN PATENT DOCUMENTS

| EP | 2244328 A2 | 10/2010 |
| EP | 2506358 A1 | 10/2012 |
| KR | 10-2011-0053712 A | 5/2011 |
| KR | 10-2012-0061235 A | 6/2012 |

OTHER PUBLICATIONS

EPO Extended Search Report dated Oct. 28, 2016, for corresponding European Patent Application No. 16154679.1 (6 pages).

* cited by examiner

*Primary Examiner* — Gary D Harris
(74) *Attorney, Agent, or Firm* — Lewis Roca Rothgerber Christie LLP

(57) ABSTRACT

A rechargeable battery includes: a case having an opening; an electrode assembly in the case and including a first electrode and a second electrode; a cap plate coupled to the opening of the case; a first current collector electrically connected to the first electrode; and a support fixed to an inner surface of the case, wherein the first current collector is hooked on the support.

10 Claims, 9 Drawing Sheets

RECHARGEABLE BATTERY HAVING CURRENT COLLECTOR

CROSS-REFERENCE TO RELATED APPLICATION

This application claims priority to and the benefit of Korean Patent Application No. 10-2015-0085280 filed in the Korean Intellectual Property Office on Jun. 16, 2015, the entire contents of which are incorporated herein by reference.

BACKGROUND

1. Field

Embodiments of the present invention relate to a rechargeable battery, and more particularly, to a rechargeable battery including a current collector.

2. Description of the Related Art

A rechargeable battery can be repeatedly charged and discharged, unlike a primary battery that is typically not recharged. Low capacity rechargeable batteries are used for small portable electronic devices such as mobile phones, laptop computers, and camcorders and large capacity batteries are widely used as power sources for driving motors of hybrid vehicles, etc.

Nowadays, a high power rechargeable battery using a non-aqueous electrolyte with high energy density has been developed, and the high power rechargeable battery is formed as a large capacity rechargeable battery by connecting a plurality of rechargeable batteries in series to use for driving a motor of a device, for example, an electric vehicle, requiring a large amount of electric power.

Further, a large capacity rechargeable battery is generally formed with a plurality of rechargeable batteries that are connected in series, and a rechargeable battery may be formed in a cylindrical shape or a rectangular shape.

The rechargeable battery includes an electrode assembly for performing charging and discharging operations, a case for accommodating the electrode assembly, and a terminal extending out of the case. The electrode assembly and the terminal are electrically connected to each other via the current collector, which is welded to a lower end of the terminal.

The above information disclosed in this Background section is provided to enhance the understanding of the background of the invention only, and therefore it may contain information that does not form prior art.

SUMMARY

The present invention has been made in an effort to provide a rechargeable battery in which a current collector can easily be coupled to a terminal.

An exemplary embodiment of the present invention provides a rechargeable battery including: a case having an opening; an electrode assembly in the case and including a first electrode and a second electrode; a cap plate coupled to the opening of the case; a first current collector electrically connected to the first electrode; and a support fixed to an inner surface of the case, wherein the first current collector is hooked on the support.

Herein, the support may include a bonding portion bonded to the case, an inclination portion obliquely bent from the bonding portion and extending away from the case, and a support portion bent from the inclination portion, parallel to a second current collector, and bonded to the second current collector.

In addition, the support may include a bonding portion bonded to the case and a support portion vertically bent from the bonding portion and extending toward the electrode assembly.

The support may further include a bonding portion bonded to the case, a support surface by which a second current collector is hooked, and an inclination surface connecting the support surface with the bonding portion.

The first current collector may include a base plate bonded to the electrode assembly and a protrusion extending from the base plate and hooked on the support.

The first current collector may further include a plurality of guide protrusions that separately extend from a front end of the protrusion.

The front end of the protrusion may be positioned on a top surface of the support and a welded portion, to which the protrusion and the support are welded, may be between the guide protrusions.

An exemplary embodiment of the present invention provides a rechargeable battery including: a case having an opening; an electrode assembly in the case and including a first electrode and a second electrode; a cap plate coupled to the opening of the case; a terminal extending through a lateral surface of the case, the terminal being electrically connected to the second electrode; and a second current collector connecting the first electrode with the terminal, the second current collector being hooked on the terminal.

Herein, the second current collector may include a base plate bonded to the electrode assembly, and a protrusion extending from the base plate and hooked on the terminal.

The second current collector may further include a plurality of guide protrusions that separately extend from the protrusion.

The terminal may include a plate terminal outside the case, a pillar terminal extending through the case, and a connection plate fixed to the pillar terminal and having a plate shape.

The connection plate may have a support opening and the pillar terminal may be in the support opening.

The connection plate may be arranged perpendicular to a bottom of the case and the protrusion may be hooked on an upper end of the connection plate.

A support may be fixed to an inner surface of the case and a first current collector may electrically connect the first electrode with the support and the first current collector may be hooked on the support.

The support may include a bonding portion bonded to the case, an inclination portion obliquely bent from the bonding portion and extending away from the case, and a support portion bent from the inclination portion, parallel to the second current collector, and bonded to the second current collector, the protrusion may be supported by a top surface of the support portion.

The support may include a bonding portion bonded to the case and a support portion vertically bent from the bonding portion to extend toward the electrode assembly.

The support may include a bonding portion bonded to the case, a support surface by which the second current collector is hooked, and an inclination surface connecting the support surface with the bonding portion.

According to the exemplary embodiments of the present invention, because the current collector is supported by the terminal or the support, the current collector can easily be coupled to the terminal, and thus the rechargeable battery according to the present exemplary embodiments can improve impact resistance.

DETAILED DESCRIPTION

Figure 1:
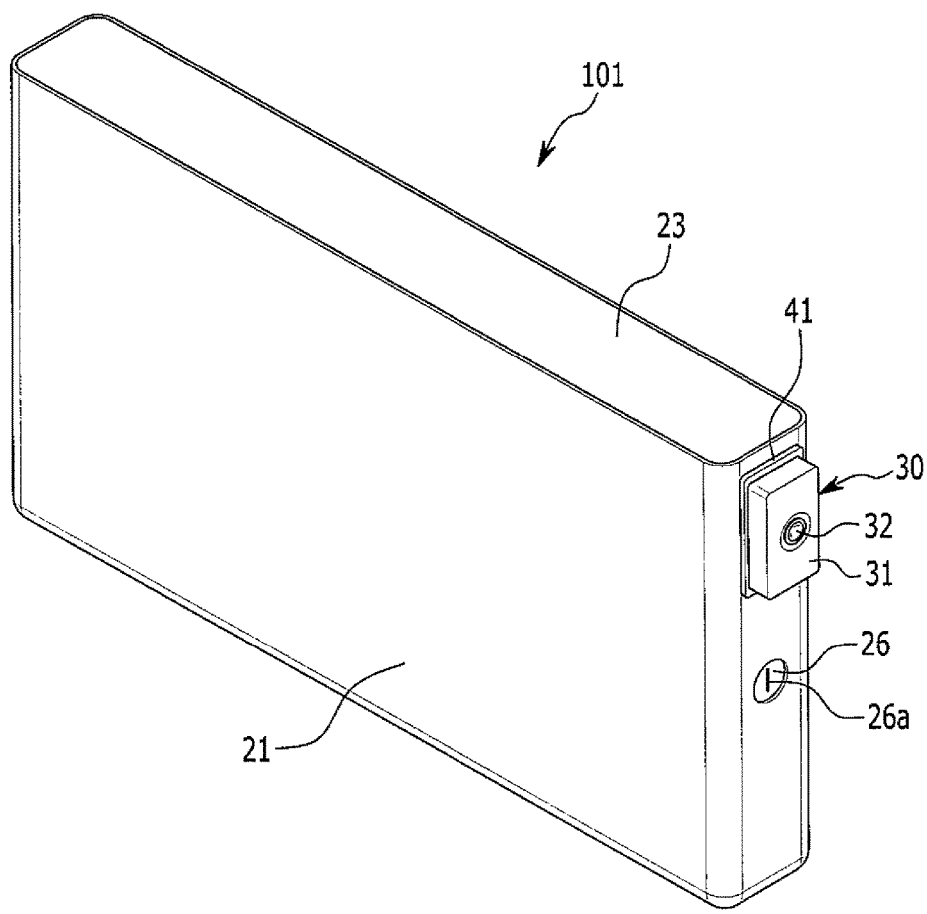
FIG. 1 is a perspective view illustrating a rechargeable battery according to a first exemplary embodiment of the present invention.

The embodiments of the present invention will be described more fully hereinafter with reference to the accompanying drawings, in which exemplary embodiments of the invention are shown. As those skilled in the art would realize, the described embodiments may be modified in various suitable ways, all without departing from the spirit or scope of the present invention. In the drawings and this specification, the same or like constituent elements (or components) are designated by the same reference numerals throughout the specification.

It will be understood that, although the terms "first", "second", "third", etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer, or section discussed below could be termed a second element, component, region, layer, or section, without departing from the spirit and scope of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Figure 2:
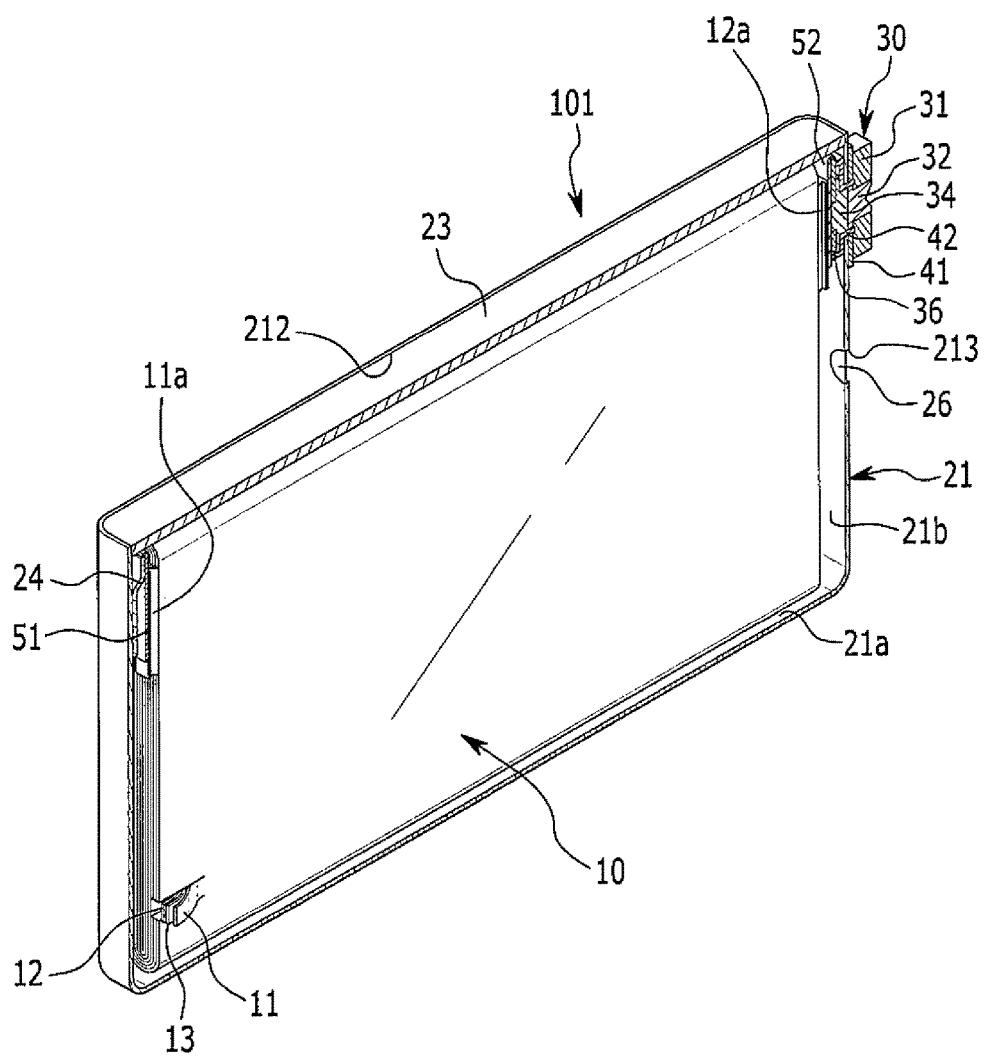
FIG. 2 is a cut-away perspective view of the rechargeable battery according to the first exemplary embodiment of the present invention.

FIG. 1 is a perspective view illustrating a rechargeable battery according to a first exemplary embodiment of the present invention, and FIG. 2 is a cut-away perspective view of the rechargeable battery according to the first exemplary embodiment of the present invention.

Referring to FIG. 1 and FIG. 2, the rechargeable battery 101 according to the first exemplary embodiment includes an electrode assembly 10 formed by winding a positive electrode (first electrode) 11 and a negative electrode (second electrode) 12 a separator 13 interposed therebetween, a case 21 in which the electrode assembly 10 is mounted, and a cap plate 23 coupled to an opening 212 of the case 21.

The rechargeable battery 101 of the present exemplary embodiment is exemplarily illustrated as a lithium ion rechargeable battery formed in the shape of a cuboid. However, the present exemplary embodiment is not limited thereto, and the embodiments of the present invention may be applied to various suitable types of batteries including a lithium polymer battery or a cylindrical battery.

The positive electrode (first electrode) 11 and the negative electrode (second electrode) 12 include coated regions where an active material is coated onto a current collector formed of a thin metal foil, and uncoated regions 11a and 12a where the active material is not coated. As shown in FIG. 2, the positive electrode uncoated region 11a is formed at one end of the electrode assembly 10, and is disposed at an upper portion of the electrode assembly 10. The negative uncoated region 12a is formed at the other side of the electrode assembly 10, and is disposed at an upper portion of the electrode assembly 10.

The case 21 has a quadrangular-column shape, and has the opening 212 formed at an upper end thereof. A step portion 214 (illustrated in FIG. 5) at which the cap plate 23 is mounted is formed in the case 21. The cap plate 23 has a long-plate shape, and is in the opening 212 of the case 21 and welded to the case 21.

A terminal 30 is in the case and mounted to one of the side surfaces of the case 21. Further, a vent opening 213 is formed at the one of the side surfaces of the case 21, and a vent plate 26 which is opened when a set pressure (e.g., a predetermined pressure) is applied to the vent opening 213. A notch 26a is formed in the vent plate 26.

Figure 3:
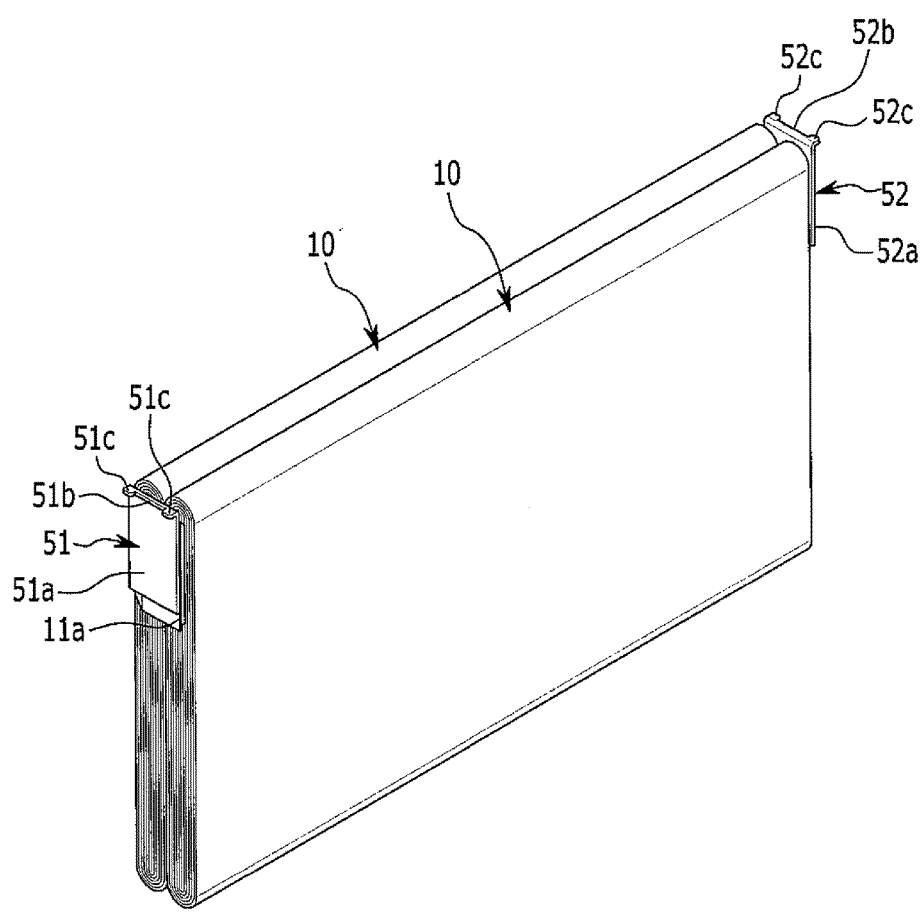
FIG. 3 is a perspective view illustrating an electrode assembly and a current collector according to the first exemplary embodiment of the present invention.

FIG. 3 is a perspective view illustrating an electrode assembly and a current collector according to the first exemplary embodiment of the present invention.

Referring to FIG. 2 and FIG. 3, a first current collector 51 is bonded to the positive electrode uncoated region 11a, and a second current collector 52 is bonded to the negative uncoated region 12a. In this case, the first current collector 51 and the second current collector 52 may respectively be bonded to the positive electrode uncoated region 11a and the negative uncoated region 12a by ultrasonic welding.

Figure 4:
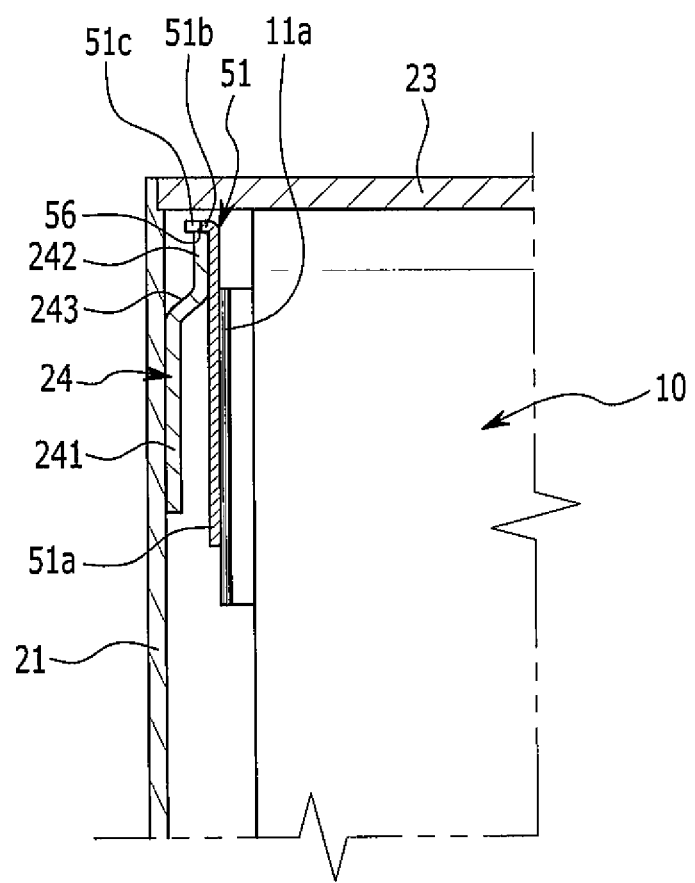
FIG. 4 is a cross-sectional view illustrating a connection structure of a first current collector according to the first exemplary embodiment of the present invention.
Figure 5:
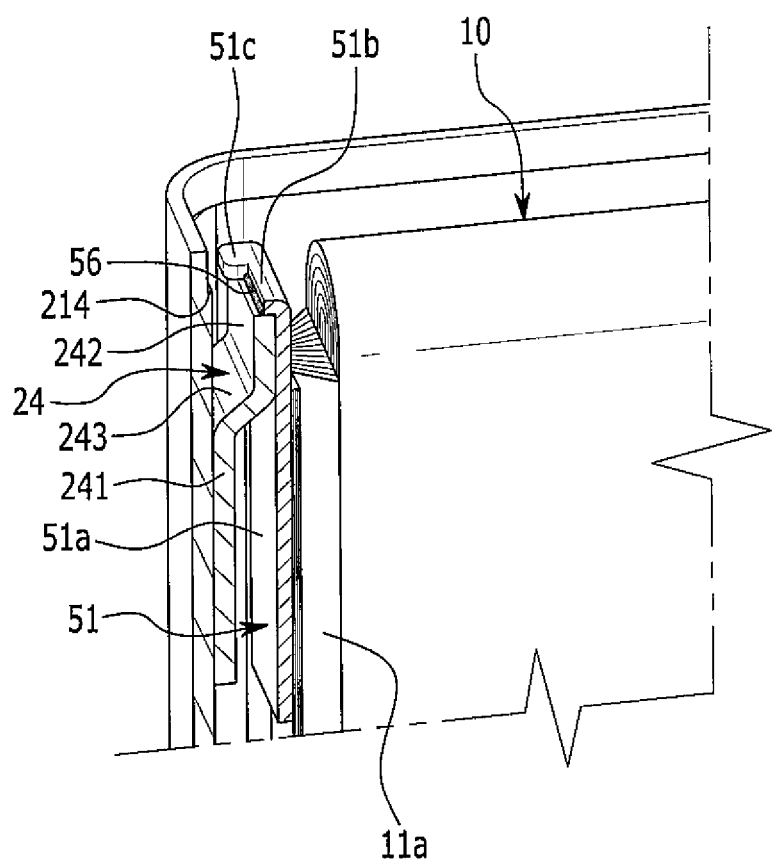
FIG. 5 is a partially cut-away perspective view of the rechargeable battery according to the first exemplary embodiment of the present invention.

FIG. 4 is a cross-sectional view illustrating a connection structure of a first current collector according to the first exemplary embodiment of the present invention, and FIG. 5 is a partially cut-away perspective view of the rechargeable battery according to the first exemplary embodiment of the present invention.

Referring to FIG. 4 and FIG. 5, a support 24 is fixed and mounted to the case 21 to face the first current collector 51. The support 24 includes a bonding portion 241 bonded to the case 21, an inclination portion 243 which is obliquely bent from the bonding portion 241 to extend away from the case 21, and a support portion 242 which is bent from the inclination portion 243 to be parallel to the first current collector 51 and bonded to the first current collector 51.

The bonding portion 241 is formed of a plate that is disposed in parallel with an inner surface of the case 21, and is welded to the inner surface of the case 21. The inclination portion 243 is obliquely bent from an upper end of the bonding portion 241 toward the electrode assembly 10. The support portion 242 is bent from the inclination portion 243 to be parallel to the first current collector 51 to contact the first current collector 51. When the support portion 242 is formed in parallel with the first current collector 51, the support portion 242 can more securely support the first current collector 51.

The first current collector 51 includes a base plate 51a, a protrusion 51b extending from the base plate 51a to be hooked on the support 24, and two guide protrusions 51c which are separately disposed to extend from the protrusion 51b.

The base plate 51a has a quadrangular-plate shape, and is bonded to the positive electrode uncoated region 11a. The protrusion 51b is bent from an upper end of the base plate 51a to extend toward the support 24. As described above, the guide protrusions 51c are separately disposed to extend from a front end of the protrusion 51b. The protrusion 51b extends and is hooked on an upper end of the support 24, and a front end of the protrusion 51b is disposed on the support 24. The guide protrusion 51c extends from the front end of the protrusion 51b toward a lateral surface of the lateral surface, and is disposed at an end portion of the protrusion 51b in a width direction.

The first current collector 51 is welded to the upper end of the support 24. In this case, the first current collector 51 is welded to the upper end of the support portion 242. A welded portion 56 is formed at the upper end of the support 24 to extend in the width direction of the support 24. The welded portion 56 is formed between the guide protrusions 51c to contact the front end of the protrusion 51b.

When the first current collector 51 is bonded to the support 24, the case 21 is positively charged. While being fixed to the electrode assembly 10, the first current collector 51 is hooked on the support 24 before being welded thereto. As such, by allowing the first current collector 51 to be hooked on the support 24, it is possible to more easily weld the first current collector 51. Further, it is possible to prevent or substantially prevent the contact between the first current collector 51 and the support 24 from deteriorating due to vibration or impact.

Figure 6:
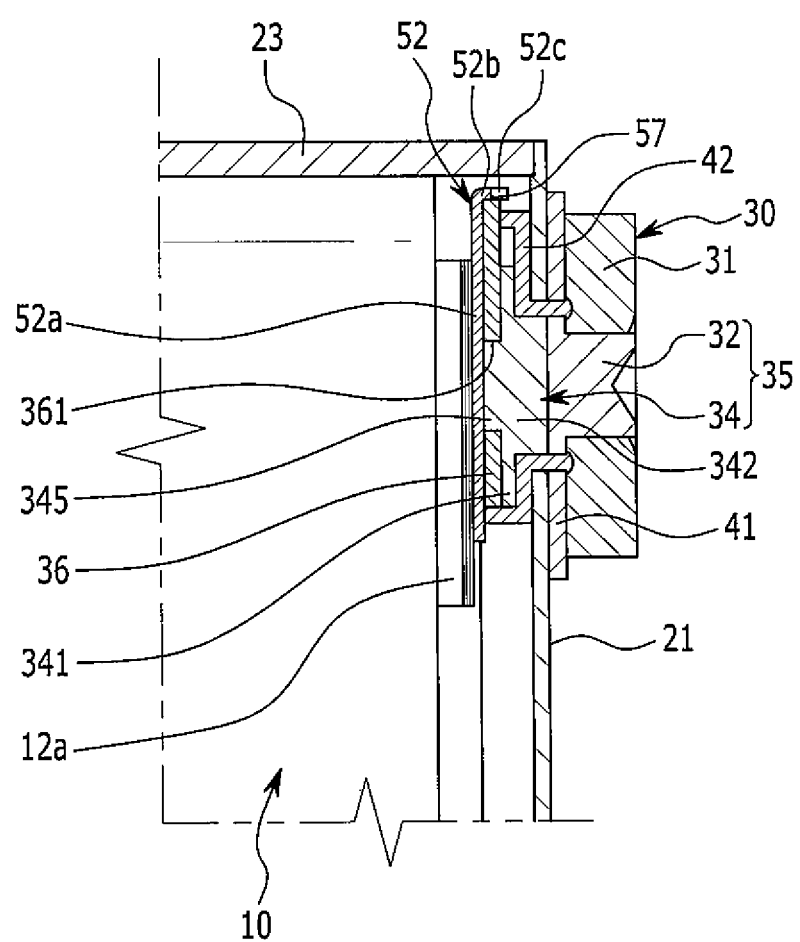
FIG. 6 is a cross-sectional view illustrating a connection structure of a second current collector according to the first exemplary embodiment of the present invention.

FIG. 6 is a cross-sectional view illustrating a connection structure of a second current collector according to the first exemplary embodiment of the present invention.

Referring to FIG. 2 and FIG. 6, the terminal 30, connected to the second current collector 52, is mounted to the case 21. The terminal 30 is extends through a lateral surface 21b of the case 21 and is electrically connected to the second electrode 12 via the second current collector 52.

The terminal 30 includes a plate terminal 31 disposed outside the case 21, a pillar terminal 35 mounted to the case and extends through the case 21, and a connection plate 36 is fixed to the pillar terminal 35 and has a plate shape. The pillar terminal 35 is in the plate terminal 31, and is fixed to the plate terminal 31 by being caulked and welded thereto.

The pillar terminal 35 includes a first pillar 32 made of aluminum and a second pillar 34 bonded to the first pillar 32 and made of copper. The first pillar 32 and the second pillar 34 may be bonded by using friction stir welding. The first pillar 32 is welded to the plate terminal 31 made of aluminum and the second pillar 34 made of copper.

The second pillar 34 has a bar-like shape, and includes a body 342 bonded to the first pillar 32, a flange 341 which extends externally and is supported by the inner surface of the case 21, and a coupling protrusion 345 extending from the flange 341 to be fitted into the connection plate 36.

The connection plate 36 has a quadrangular shape, and is arranged perpendicular to a bottom 21a of the case 21 and is disposed in parallel with the lateral surface 21b of the case 21. A support opening 361, into which the coupling protrusion 345 is inserted, is formed in the connection plate 36, and the connection plate 36 is welded to the second pillar 34 in a state in which the coupling protrusion 345 is inserted therein.

The second current collector 52 includes a base plate 52a, a protrusion 52b extending from a front end of the base plate 52a and hooked on the terminal 30, and two guide protrusions 52c which are separately disposed to extend from the protrusion 52b.

The base plate 52a has a quadrangular shape, and is bonded to the negative uncoated region 12a. The base plate 52a is disposed in parallel with the connection plate 36 to contact the connection plate 36. The protrusion 52b is bent from an upper end of the base plate 52a to extend toward the terminal 30. As described above, the guide protrusions 52c are separately disposed to extend from a front end of the protrusion 52b. The protrusion 52b extends and is hooked on an upper end of the connection plate 36, and a front end of the protrusion 51b is disposed on the protrusion 52b.

The second current collector 52 is welded to an upper end of the connection plate 36. In this case, a front end of the protrusion 52b is welded to the connection plate 36. A welded portion 57 is formed at the upper end of the connection plate 36 to extend in a width direction of the connection plate 36, and is formed between the guide protrusions 52c.

While being fixed to the electrode assembly 10, the second current collector 52 is hooked on the terminal 30 to be welded thereto. As such, by allowing the second current collector 52 to be hooked on the terminal 30, it is possible to more easily weld the second current collector 52. Further, it is possible to prevent or substantially prevent the contact between the second current collector 52 and the terminal 30 from deteriorating due to vibration or impact.

Figure 7:
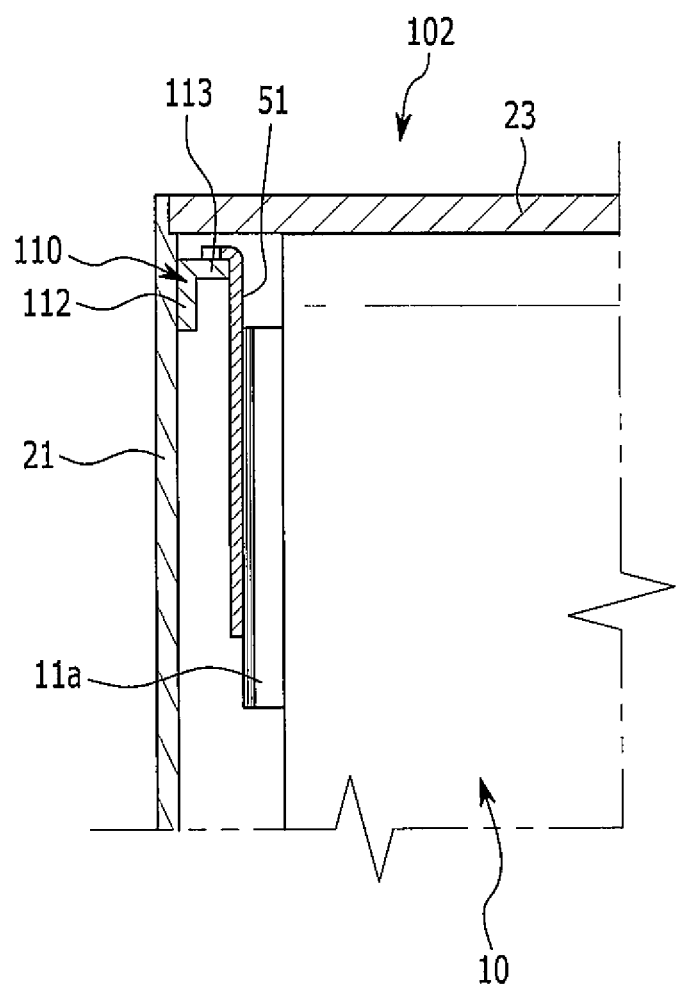
FIG. 7 is a cross-sectional view illustrating a portion of a rechargeable battery according to the second exemplary embodiment of the present invention.

FIG. 7 is a cross-sectional view illustrating a portion of a rechargeable battery according to the second exemplary embodiment of the present invention.

Referring to FIG. 7, since the rechargeable battery 102 according to the second exemplary embodiment has the same or substantially the same structure as that of the rechargeable battery according to the first exemplary embodiment except for a support 110, a duplicate description of the same or substantially the same structure may be omitted.

The support 110 includes a bonding portion 112 which is welded and fixed to a lateral surface of the case 21 and a support portion 113 bent from the bonding portion 112 to extend toward the electrode assembly 10. The bonding portion 112 has a quadrangular-plate shape, and is welded and fixed to an inner surface of the case 21. The support portion 113 is vertically bent from an upper end of the bonding portion 112 to extend away from the case 21. The first current collector 51 is welded to the support portion 113 while being hooked on a top surface of the support portion 113.

Figure 8:
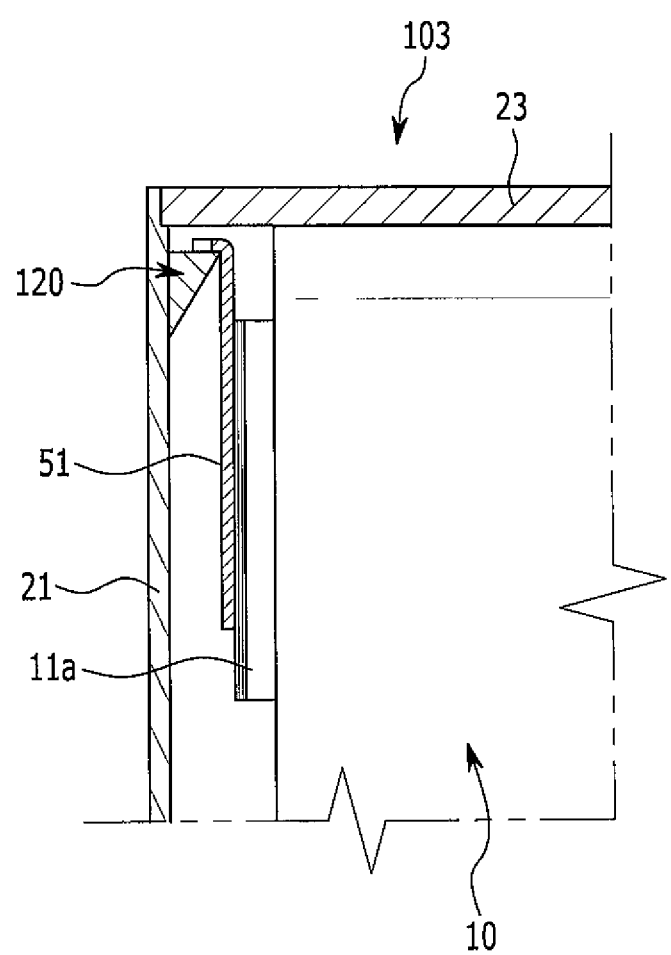
FIG. 8 is a cross-sectional view illustrating a portion of a rechargeable battery according to a third exemplary embodiment of the present invention.
Figure 9:
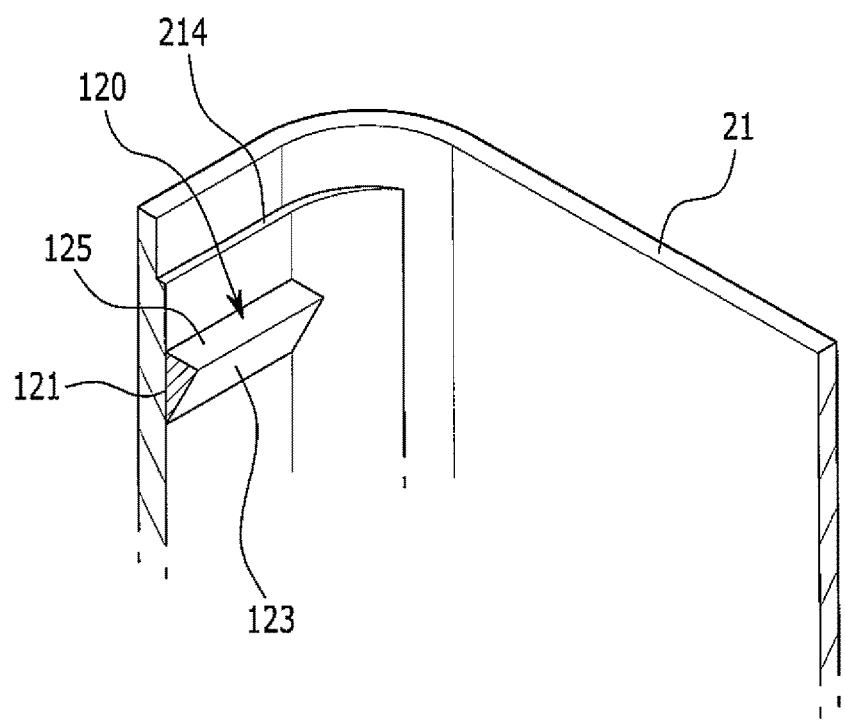
FIG. 9 is a cut-away perspective view illustrating a case and a support according to the third exemplary embodiment of the present invention.

FIG. 8 is a cross-sectional view illustrating a portion of a rechargeable battery according to a third exemplary embodiment of the present invention, and FIG. 9 is a cut-away perspective view illustrating a case and a support according to the third exemplary embodiment of the present invention.

Referring to FIG. 8 and FIG. 9, since the rechargeable battery 103 according to the third exemplary embodiment has the same or substantially the same structure as that of the rechargeable battery according to the first exemplary embodiment except for a support 120, a duplicate description of the same or substantially the same structure may be omitted.

The support 120 includes a bonding portion 121 which is welded and fixed to a lateral surface of the case 21, a support surface 125 extended from the bonding portion 121 to hook the first current collector 51, and an inclination surface 123 for connecting the bonding portion 121 with the support surface 125.

The support 120 has a bar-like shape having a triangular cross-section, one surface of which serves as the bonding portion 121 welded to an inner surface of the case 21. The bonding portion 121 and the support surface 125 are vertically connected to each other, and the inclination surface 123 is obliquely connected to the bonding portion 121 and the support surface 125. The first current collector 51 is welded to the support surface 125 while being hooked on the support surface 125.

While this invention has been described in connection with what is presently considered to be practical exemplary embodiments, it is to be understood that the invention is not limited to the disclosed embodiments, but, on the contrary, is intended to cover various suitable modifications and equivalent arrangements included within the spirit and scope of the appended claims and their equivalents.

DESCRIPTION OF SOME OF THE REFERENCE CHARACTERS

| | |
|---|---|
| 101, 102, 103: rechargeable battery | 10: electrode assembly |
| 11: positive electrode | 11a: positive electrode uncoated region |
| 12: negative electrode | 12a: negative uncoated region |
| 13: separator | 21: case |
| 212: opening | 213: vent opening |
| 214: step portion | 21a: bottom |
| 21b: lateral surface | 23: cap plate |
| 24, 110, 120: support | 241, 112, 121: bonding portion |
| 242, 113: support portion | 243: inclination portion |
| 123: inclination surface | 125: support surface |
| 26: vent plate | 26a: notch |
| 30: terminal | 31: plate terminal |
| 32: first pillar | 34: second pillar |
| 341: flange | 342: body |
| 345: coupling protrusion | 35: pillar terminal |
| 36: connection plate | 361: support opening |
| 51: first current collector | 51a: base plate |
| 51b: protrusion | 51c: guide protrusion |
| 52: second current collector | 52a: base plate |
| 52b: protrusion | 52c: guide protrusion |
| 56, 57: welded portion | |

What is claimed is:

1. A rechargeable battery comprising:
a case having an opening at an upper end of the case opposite a bottom of the case, the bottom of the case being spaced apart from the upper end in a first direction;
an electrode assembly in the case and comprising a first electrode and a second electrode, the electrode assembly being insertable in the first direction through the opening of the case;
a cap plate coupled to the opening of the case;
a terminal extending through a lateral surface of the case in a second direction transverse to the first direction, the lateral surface extending in the first direction between the bottom of the case and the upper end of the case, the terminal being electrically connected to the second electrode; and
a second current collector connecting the second electrode with the terminal, the second current collector being hooked on the terminal.

2. The rechargeable battery of claim 1, wherein the second current collector comprises:
a base plate bonded to the electrode assembly; and
a protrusion extending from the base plate and hooked on the terminal.

3. The rechargeable battery of claim 2, wherein the second current collector further comprises:
a plurality of guide protrusions that separately extend from the protrusion.

4. The rechargeable battery of claim 2, wherein the terminal comprises:
a plate terminal outside the case;
a pillar terminal extending through the case; and
a connection plate fixed to the pillar terminal and having a plate shape.

5. The rechargeable battery of claim 4,
wherein the connection plate has a support opening, and wherein at least a portion of the pillar terminal is in the support opening.

6. The rechargeable battery of claim 4,
wherein the connection plate is arranged perpendicular to the bottom of the case, and
wherein the protrusion is hooked on an upper end of the connection plate.

7. The rechargeable battery of claim 2,
wherein a support is fixed to an inner surface of the case, and
wherein a first current collector, electrically connecting the first electrode with the support, is hooked on the support.

8. The rechargeable battery of claim 7, wherein the support comprises:
a bonding portion bonded to the case;
an inclination portion obliquely bent from the bonding portion and extending away from the case; and
a support portion bent from the inclination portion, parallel to the first current collector, and bonded to the first current collector,
wherein the first current collector comprises a protrusion that is supported by a top surface of the support portion.

9. The rechargeable battery of claim 7, wherein the support comprises:
a bonding portion bonded to the case; and
a support portion vertically bent from the bonding portion and extending toward the electrode assembly.

10. The rechargeable battery of claim 7, wherein the support comprises:
a bonding portion bonded to the case;
a support surface by which the first current collector is hooked; and
an inclination surface connecting the support surface with the bonding portion.

* * * * *